United States Patent [19]
Murakami

[11] 4,279,089
[45] Jul. 21, 1981

[54] OPTICAL ILLUMINATION DEVICE

[76] Inventor: Tatsuo Murakami, 522 Kamiumamachi, Sanchome, Higashioji Higashiiru, Shibutanidori Higashiyama-ku, Kyoto, Japan

[21] Appl. No.: 73,012

[22] Filed: Sep. 6, 1979

[30] Foreign Application Priority Data

Jul. 11, 1978 [JP] Japan .................................. 53/137624
Sep. 8, 1978 [JP] Japan .......................... 53/124255[U]

[51] Int. Cl.³ .............................................. G09F 13/18
[52] U.S. Cl. ....................................... 40/547; 340/380; 350/96.25
[58] Field of Search ................... 40/547, 433; 340/380; 350/96.25, 96.22

[56] References Cited

U.S. PATENT DOCUMENTS

| | | | |
|---|---|---|---|
| 2,639,528 | 5/1953 | Ochsner | 40/547 |
| 3,050,888 | 8/1962 | Myers et al. | 40/433 |
| 3,104,324 | 9/1963 | Rabinow | 350/96.25 X |
| 3,164,918 | 1/1965 | Brown | 340/380 X |
| 3,184,872 | 5/1965 | Way | 40/547 X |
| 3,431,410 | 3/1969 | Dolan et al. | 40/433 |
| 3,512,861 | 5/1970 | Schackert | 350/96.25 |
| 3,536,908 | 10/1970 | Oster | 40/547 |
| 3,766,376 | 10/1973 | Sadacca et al. | 40/433 |
| 3,803,398 | 4/1974 | Walker | 40/433 |
| 3,933,556 | 1/1976 | Strack | 350/96.25 X |
| 4,121,206 | 10/1978 | Lemire | 340/380 |

*Primary Examiner*—John F. Pitrelli

[57] ABSTRACT

This invention relates to an optical illumination device using optical fiber members. Basically, one of the respective ends of optical fiber members is opposed to a light source, with a filter disposed between the one end and the light source, the filter being movable across the path of incident light from the source to cause the other ends of the optical fiber members to illuminate with varying colors. In such basic arrangement, the optical illumination device of the invention is characterized in that the illuminating end side of a number of optical fiber members is disposed along the lateral surface of a significant-form representing member which represents a letter, figure or the like, so that the illuminating end surfaces of the optical fibers are positioned at the end edge of the significant-form member.

3 Claims, 9 Drawing Figures

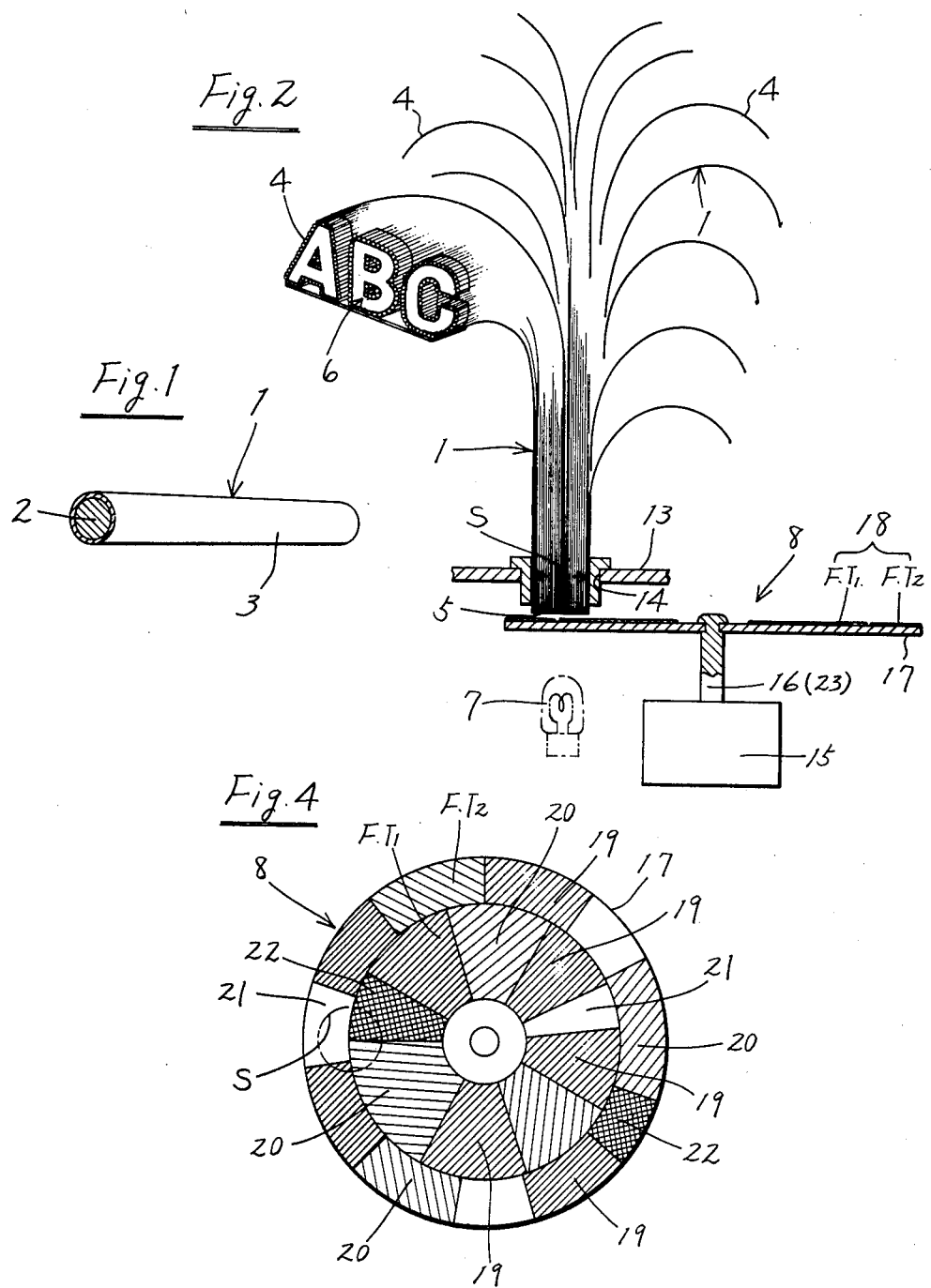

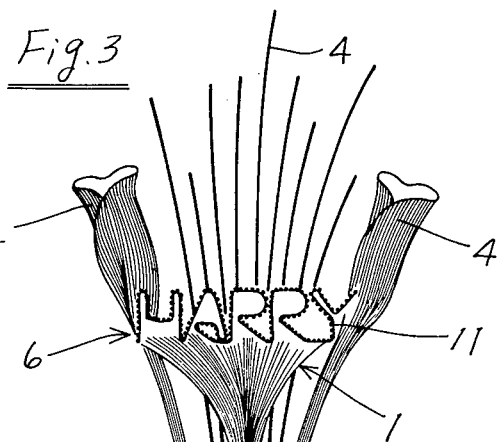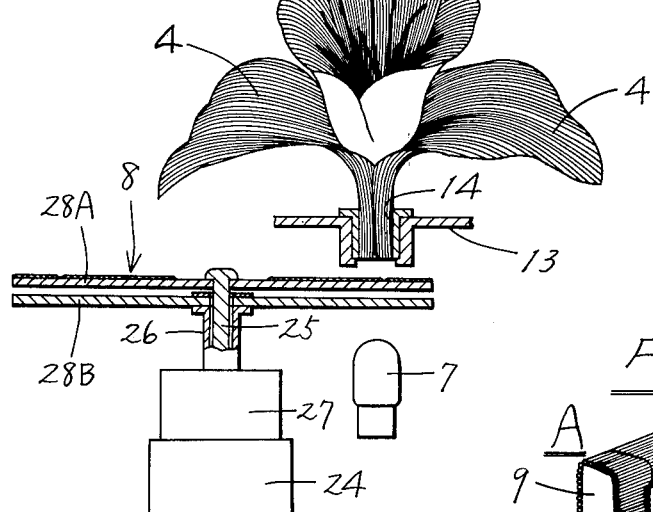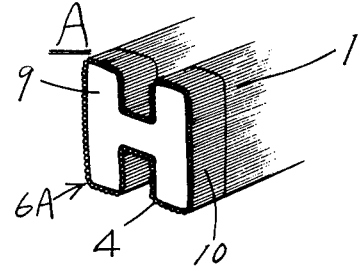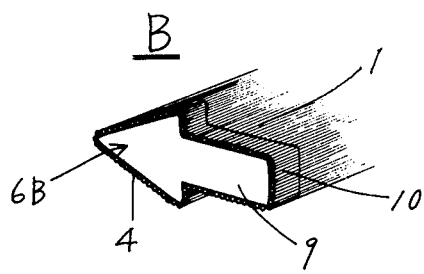

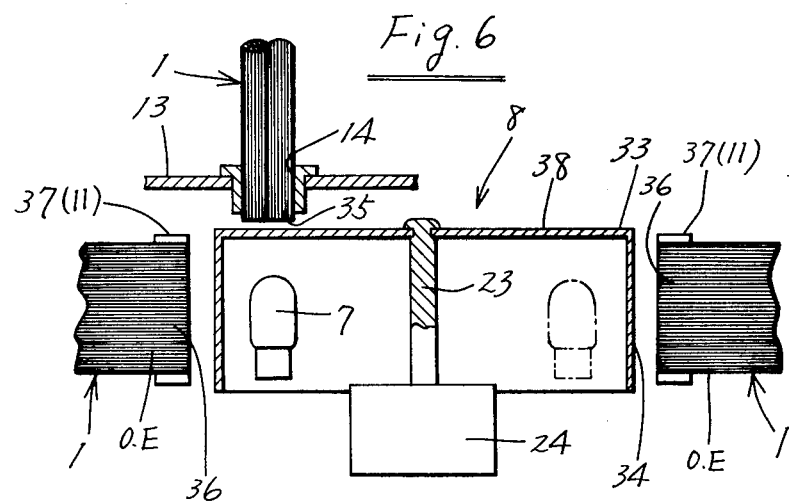
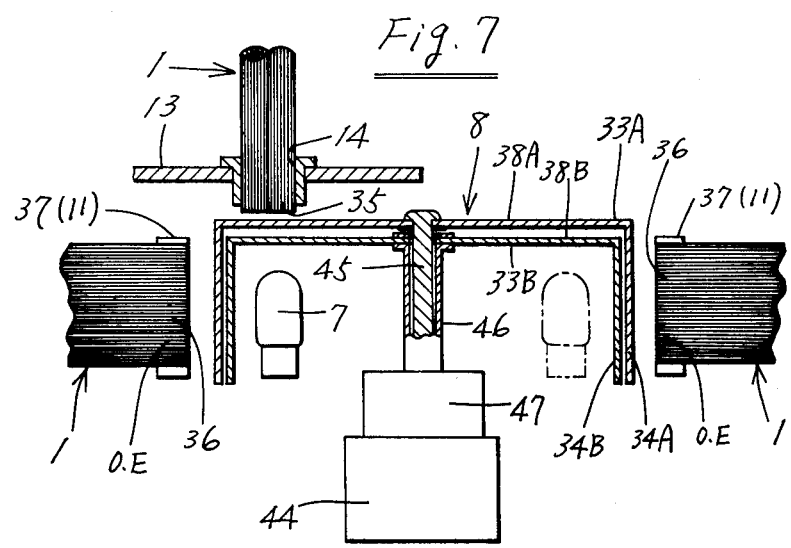

OPTICAL ILLUMINATION DEVICE

BACKGROUND OF THE INVENTION

As is known in the art, an optical fiber is a slender bar-like optical light-transmitting element comprising a core and a sheathing layer concentric therewith which is made of a material having a lower refractive index than said core. Such optical fiber functions optically as a light-transmitting element to transmit light incident on one end thereof to the other end through the core while allowing the light to totally reflect on the interface between the core and the sheathing layer. In recent years, optical fibers of this type have been in great demand for use as light-transmitting elements for optical illumination devices including optical systems. Conventionally, optical illumination devices using this type of optical fibers have a disadvantage that it is very difficult to arrange and support the illuminating end side of a number of optical fibers in such a manner as to respresent a desired pattern, such as a letter or figure.

SUMMARY OF THE INVENTION

An object of the invention is to provide an optical illumination device wherein the illuminating end side of a number of optical fibers if fixedly arranged through a significant-form member of desired pattern to optically present a letter, figure or the like.

Another object of the invention is to provide an optical illumination device which is simple in construction and easy to produce and which is designed to optically present a letter, figure or the like.

These objects are achieved by providing an optical illumination device using optical fibers wherein one of the respective ends of the optical fibers is opposed to a light source, with a filter disposed between said light-facing ends and said light source, said filter being movable across the path of incident light from said light source to cause the other end side of said optical fibers to illuminate with varying colors, said optical illumination device being characterized in that the illuminating end side of a number of optical fiber members is disposed along the lateral surface of a significant-form representing member which represents a letter, figure or the like so that the illuminating end surfaces of the optical fibers are positioned at the end edge of said significant-form member.

BRIEF DESCRIPTION OF THE DRAWINGS

The drawings illustrate concrete examples of the optical illumination device using optical fibers according to the invention.

FIG. 1 is an enlarged perspective view of an optical fiber member applied to the present invention;

FIG. 2 is a schematic side view, in section, illustrating a device embodying the invention;

FIG. 3 is a schematic side view, in section, of another example of a device, showing the application of a laminated filter mechanism;

FIG. 4 is a plan view of a filter member having a plurality of filter tracks;

FIGS. 5A, 5B and 5C are schematic perspective views showing different examples of the significant-form representing member which represents a letter, figure or the like, and FIGS. 6 and 7 are schematic side views, in section, showing examples of the application of a drum type filter member.

DETAILED DESCRIPTION OF THE PREFERRED EMBODIMENTS

Optical illumination devices using optical fibers according to the invention will now be described on the basis of embodiments thereof shown in the drawings.

An optical fiber member 1 applied to the invention, as shown in FIG. 1, is composed of a slender bar-like fiber material having a core 2 and a sheathing layer 3 concentric therewith having a different refractive index. The refractive index of the core 2 of said optical fiber 1 is usually greater than that of said sheathing layer 3. The core 2 is made of polymethyl methacrylate or the like, while the sheathing layer 3 is made of fluorine-containing copolymer resin or the like.

FIGS. 2 and 3 are schematic side views, in section, showing different examples of the application of the device embodying the invention. As is apparent from these figures, the device of the invention comprises, basically, optical fiber members 1 bunched in a desired form, means 6 for representing a significant form, such as a letter or a figure, provided by treating said optical fiber members 1 at their one end 4 to represent a letter, figure or the like, at least one light source 7 opposed to the other ends 5 of said optical fiber members 1, and filter means 8 disposed between the light-receiving ends 5 of said optical fiber members 1 and said light source 7 and movable across the path of incident light. In the arrangement of the invention, at least one end side of a number of optical fibers is linearly arranged and connected. In this case, the other end side of said optical fibers may be linearly arranged and bonded in a relation corresponding to said arranged ends or may be treated in an asymmetrical relation. In performing the connecting treatment of said arranged ends, a viscous tape member or, more preferably, a double-surface adhesive tape member is used. On the other hand, in connection with the means for representing a significant form such as a letter or a figure, in connecting the arranged end side of said optical fiber members, a configurationally retentive flexible member which can be easily bent and will undergo plastic deformation, not restoring its original shape, such as an aluminum band-like body, is applied. Further, in arranging and fixing said optical fiber members, said optical fibers may be mutually closely adjacently linearly arranged or may be arranged so that adjacent optical fibers are spaced a predetermined distance. Next, the means 6 for representing a significant form, such as a letter or a figure, provided by treating the illuminating end side of a number of optical fibers will be described with reference to concrete examples thereof shown. Significant-form representing members 6A and 6B shown in FIGS. 5A and 5B, which represent a letter, a figure or the like, are fixed members having an end surface portion 9 treated to represent a significant form, such as a letter or figure, and a peripheral wall portion 10 which is generally perpendicular to said end surface portion. The fixed letter, figure or other significant-form representing members 6A and 6B can be easily and economically formed by applying a die bearing a letter, figure or the like, vacuum-forming a plastic material, performing the so-called blister treatment, forming a raised portion which represents a significant form such as a letter or a figure, and subjecting said raised portion to cutting treatment. Further, the significant-form representing members 6A and 6B in these examples may be obtained by processing paperboard, wood, plastic or metal in such a manner as to provide said end surface portion 9 which represent a letter, figure or the like and said peripheral wall portion 10. With respect to the significant-form representing members 6A and 6B, the arranged ends of said optical fibers 1 are bonded along the peripheral surface 10 of said significant-form representing member so that the light-receiving ends 4 of said optical fibers may represent a letter, figure or the like. On the other hand, a letter, figure or other significant-form representing member 6C shown in FIG. 5C is in the form of representing letters or the like in a continuous manner and is formed by a band-like member 11 which also serves as means for fixedly connecting the arranged ends of the optical fibers. The band-like body 11 is preferably a configurationally retentive flexible member which can be easily bent and which will undergo plastic deformation, not restoring its original shape, after bending, for example. The member can be formed of aluminum. The arranged ends of the optical fibers are bonded along at least one lateral surface of said band-like member 11. Thereafter, the band-like member is suitably bent so as to represent a significant form, such as letters or figures, in a continuous manner. In forming this significant-form representing member 6C, if the optical fiber members are cut at the rear end side of said bank-like member 9, then it is possible to form a discontinuous illuminating letter array by the continuous band-like member. Further, a significant-form representing body in another example may be formed by a plastic material which will be cured by being subjected to a thermosetting treatment. Also, the other ends 5 of the optical fibers are treated similarly and are simply bunched or regularly arranged to be coincident with said letter, figure or other significant-form members, the ends 5 being cut at a portion of predetermined length, and attached to a top opening 14 in a casing 13 so as to be opposed to the at least one light source 7.

Next, a description will be given of the filter means 8 movable across the path of incident light between the light-receiving end side 5 of the optical fiber members 1 so as to cause the illuminating end side of said optical fiber members to illuminate with varying colors. The filter means 8 is provided with rotating means 15 for moving the same across the path of incident light between the light-receiving end side 5 of said optical filters 1 and the light source and is constituted by a disc-like rotary filter 17 mounted on a rotary shaft 16. The rotary filter 17 has a colored light-penetrable layer 18 suitably divided in the direction of rotation thereof. The colored light-penetrable layer 18, as shown in FIG. 4, may comprise monochromatic segments 19 or segments 20 having multicolored stripes inclined with respect to the direction of rotation of said rotary filter. Further, it may locally contain perfectly light-penetrable portions 21 and perfectly light-shielding portions 22. Further, said colored light-penetrable layer may be of spiral pattern or of polka dot pattern. Thus, said filter is not limited to the embodiments described above provided that the manner of illumination of the illuminating end side of said optical fibers is regularly or irregularly changed by the movement of the filter when the light from the light source is introduced to the light-receiving ends of the fibers. On the other hand, as shown in FIG. 4, with respect to a light-receiving end opening area S for arranging the light-receiving ends of said optical fibers, and at a position crossing said light-receiving area, it is possible to divide the colored layer of said filter into a plurality of filter tracks $FT_1$ and $FT_2$. In this example, corresponding to a track position corresponding to the first filter track $FT_1$, optical fiber members having the illuminating end side thereof treated by a letter, figure or other significant-form representing body may be regularly or irregularly bunched and positioned, while corresponding to a track position corresponding to the second filter track $FT_2$, optical fiber members having the illuminating end side thereof treated in a fountain fashion may be bunched and positioned, whereby two different filter effects which can be suitably selected are obtained. Further, said filter means 8, as shown in FIG. 3, may be composed of at least two filter members 28A and 28B, first and second, placed one above the other and placed across said path of light. In this case, the first and second filter members 28A and 28B are connected to a rotary drive source 24 through a common rotary shaft 23 or through first and second separate rotary shafts 25 and 26 and through a rotation control device 27. The first and second rotary filters 28A and 28B are arranged so that they move at different speeds across the path of incident light between the light-receiving ends 5 of said optical fibers and the light source 7. Further, it is also possible to arrange the first and second rotary filters 28A and 28B so that they move in mutually opposite directions. Additionally, the first and second members 28A and 28B may be arranged so that one rotary filter 28A continuously rotates while the other rotary filter 28B moves intermittently. As shown in FIG. 6, the filter means 8 comprises a filter 38 having a disc-like filter portion 33 and a cylindrical filter portion 34 connected to the periphery of said disc-like filter portion 33. With the filter member 38 in this example, it is possible to form light-receiving end sections 35 and 36 of differently treated optical fibers with respect to the filter portions 33 and 34. In this example, the optical fiber light-receiving side 36 associated with the cylindrical filter portion 34 may be arranged around the entire peripheral lateral surface of the cylindrical filter portion 34 through a light-receiving end arranging member 37. As a example of said light-receiving end arranging member 37, use may be made of the band-like member 11 of aluminum applied as means for representing a letter, figure or other significant form. According to this example, said significant-form treated side and light-receiving end side can be regularly arranged. Further, in this example, the light-receiving ends 36 treated by said band-like member 11 are relatively arranged in a plurality of arrays to cross at a fixed angle with respect to the color boundary line of said cylindrical filter 34 so that the initial and terminal ends in each array unit in the respective light receiving end arrays are in phase with each other with respect to the color boundary line of said color filter. By this arrangement, it is possible to cause the illuminating. ends of the optical fibers to illuminate with varying colors continuously from a predetermined initial point to a terminal point.

On the other hand as shown in FIG. 7, said filter means 8 is formed by a combination of an outer filter member 38A having a disc-like filter portion 33A and a cylindrical filter portion 34A and an inner filter member 38B having a disc-like filter portion 33B and a cylindrical filter portion 34B. In this case, the outer and inner filter members 38A and 38B are connected to a rotary drive source 44 through separate rotary shafts 45 and 46 and through a rotation control device 47. The outer and inner filter members 38A and 38B are arranged to move at different speeds across the path of incident light between the light-receiving ends 5 of said optical fibers and the light source 7. Further, it is also possible to assemble said outer and inner filter members 38A and 38B so that they move in mutually opposite directions. Additionally, said outer and inner filter members 38A and 38B may be arranged so that one of them, for example, the outer filter member 38A continuously rotates while the inner filter member 38B moves intermittently.

With the optical illumination device using optical fibers arranged in the manner described above, it is possible to treat the illuminating end side of the optical fibers with great ease to represent a letter, figure or other significant form. By the application of the various filter means disclosed in the invention, it is possible to cause the illuminating ends of the optical fibers treated to represent a significant form as described above to illuminate with varying colors continuously according to a predetermined rule, for example, the order of making strokes in writing a character. Further, by suitably selectively changing the filter means as shown in the embodiments, the manner in which the illuminating ends of the optical fibers illuminate with varying colors can be variegated. In these respects, the optical illumination device according to the invention can be said to be rich in variety as an optical illumination device using optical fibers. Thus, the invention is extremely useful.

What we claim is:

1. An optical illumination device having a plurality of optical fibers comprising adjacent fibers abutting each other in a linear arrangement and each having a light receiving end and an illuminating end;

an integral band member having a shape that varies in direction along its length to form a predetermined indicia forming configuration;

said band having an outer edge located at said illuminating ends of said fibers so that said band extends coterminous with said fibers for a substantial distance;

said band having an outer surface to which said abutting fibers are fastened, which surface is in a plane perpendicular to the plane of said illuminated ends of said fibers, whereby said fiber arrangement forms the same predetermined configuration as said band member; a flat surface, indicia forming member is provided having outer edges formed in the same shape as said predetermined configuration, said flat surface member connected to said outer edge of said band member at an angle perpendicular thereto whereby said fibers are arranged along the periphery of said flat surface member thereby providing an illuminated outline of said member when said fibers are illuminated.

2. An optical illumination device according to claim 1 wherein said band is formed of flexible material to be bent into said predetermined configuration.

3. An optical illumination device according to claim 1 wherein said band member is formed of curable plastic.

* * * * *